US012214354B2

(12) United States Patent
Heikkilä et al.

(10) Patent No.: US 12,214,354 B2
(45) Date of Patent: Feb. 4, 2025

(54) RESTRAINING OF SERVICE ACCESS TO HSI CRUSHER CHAMBER

(71) Applicant: Metso Outotec Finland Oy, Tampere (FI)

(72) Inventors: Juhamatti Heikkilä, Tampere (FI); Marko Lamminmäki, Tampere (FI)

(73) Assignee: Metso Finland Oy, Espoo (FI)

( * ) Notice: Subject to any disclaimer, the term of this patent is extended or adjusted under 35 U.S.C. 154(b) by 144 days.

(21) Appl. No.: 17/909,008

(22) PCT Filed: Feb. 25, 2021

(86) PCT No.: PCT/FI2021/050137
§ 371 (c)(1),
(2) Date: Sep. 2, 2022

(87) PCT Pub. No.: WO2021/176136
PCT Pub. Date: Sep. 10, 2021

(65) Prior Publication Data

US 2023/0092458 A1 Mar. 23, 2023

(30) Foreign Application Priority Data

Mar. 6, 2020 (FI) ..................................... 20205243

(51) Int. Cl.
*B02C 13/31* (2006.01)
*B02C 13/02* (2006.01)
*B02C 13/26* (2006.01)

(52) U.S. Cl.
CPC .............. *B02C 13/31* (2013.01); *B02C 13/02* (2013.01); *B02C 13/26* (2013.01)

(58) Field of Classification Search
CPC .. B02C 13/31; B02C 23/04; F16P 3/08; F16P 3/10
(Continued)

(56) References Cited

U.S. PATENT DOCUMENTS 694,096 A * 2/1902 Fillingham ............... F16P 3/08 241/230
4,043,514 A * 8/1977 Peterson, Jr. ........... B02C 23/04 241/37.5
(Continued)

FOREIGN PATENT DOCUMENTS

CN 103657827 A 3/2014
CN 204412365 U 6/2015
(Continued)

OTHER PUBLICATIONS

Search Report for Chinese Patent Application No. 202180018778.3, dated Mar. 20, 2023.
(Continued)

*Primary Examiner* — Jared O Brown
(74) *Attorney, Agent, or Firm* — Andrus Intellectual Property Law, LLP

(57) ABSTRACT

A restraint apparatus, a horizontal shaft crusher including the restraint apparatus and a method for controlling access to a crushing chamber of the horizontal shaft crusher. The first restraint has an operation mode and a service mode for respectively blocking and allowing opening of a service hatch for accessing the crushing chamber. A second restraint has an operation mode and a service mode for respectively not controlling the horizontal shaft and controlling the horizontal shaft. The first and second restraints are mutually exclusively usable in the operation mode so that the crushing chamber is not accessible through the service hatch unless the second restraint is controlling the horizontal shaft.

12 Claims, 3 Drawing Sheets

(58) Field of Classification Search
USPC .......................................................... 241/37.5
See application file for complete search history.

(56) References Cited

U.S. PATENT DOCUMENTS

| | | | | |
|---|---|---|---|---|
| 5,850,730 | A | 12/1998 | Wassenhoven | |
| 6,016,855 | A * | 1/2000 | Morey .................... | B02C 23/04 241/101.76 |
| 2016/0129451 | A1 | 5/2016 | Dallimore et al. | |
| 2017/0165677 | A1 * | 6/2017 | Johnston ................. | B02C 23/04 |

FOREIGN PATENT DOCUMENTS

| | | | | |
|---|---|---|---|---|
| CN | 206404853 | U | 8/2017 | |
| CN | 109414701 | A | 3/2019 | |
| CN | 209362597 | U | 9/2019 | |
| DE | 3911365 | C1 | 5/1990 | |
| DE | 4010954 | A1 | 10/1990 | |
| EP | 3178563 | A1 | 6/2017 | |
| JP | S48107384 | U | 12/1973 | |
| JP | S5116471 | U | 2/1976 | |
| JP | H05111628 | A | 5/1993 | |
| JP | 2016120450 | A | 7/2016 | |
| WO | WO-03033154 | A1 * | 4/2003 | ............. B02C 23/04 |
| WO | 2019149982 | A1 | 8/2019 | |

OTHER PUBLICATIONS

Search Report issued in Finnish priority Application No. 20205243 dated Sep. 22, 2020.

International Search Report and Written Opinion for international priority Application No. PCT/FI2021/050137 mailed May 28, 2021.

Office Action for Japanese Patent Application No. 2022-552507, dated Nov. 25, 2024.

* cited by examiner

Fig. 5

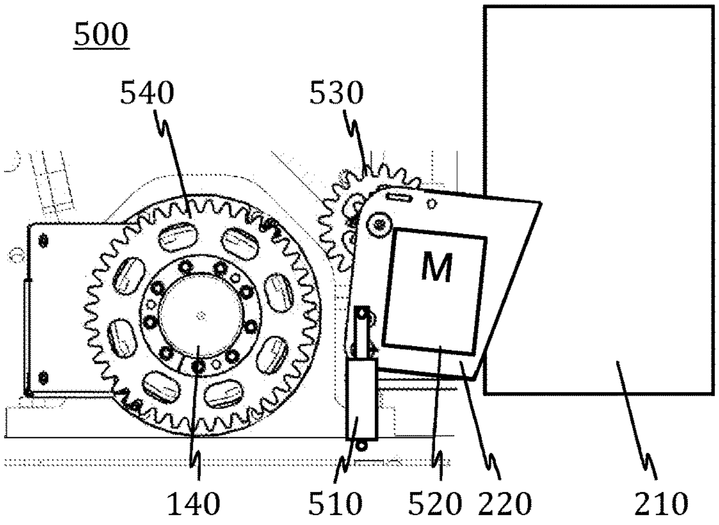

Fig. 6

600

| |
|---|
| 610. supporting the first restraint movably between the blocking state and the access state in which in the first restraint respectively restrains and allows opening of the service hatch for service access |
| 620. supporting the second restraint movably between the control state and the running state |
| 630. supporting movably by the second restraint the engagement member so that when the second restraint is in the control state, the engagement member is in a use position for restraining rotation of the horizontal shaft; and when the second restraint is in the running state, the engagement member is in an idle position for not restraining the rotation of the horizontal shaft |
| 640. using the first and second restraints collectively to prevent moving the first restraint from the blocking state to the access state if the second restraint is in the running state |
| 650. using the first and second restraints collectively to prevent moving the second restraint from the control state to the running state if the first restraint is in the access state |
| 660. using the first and second restraints collectively to allow moving the first restraint from the access state to the blocking state |
| 670. using the first and second restraints collectively to allow moving the second restraint from the running state to the control state |

RESTRAINING OF SERVICE ACCESS TO HSI CRUSHER CHAMBER

CROSS-REFERENCE TO RELATED APPLICATIONS

This application is the U.S. national stage application of International Application PCT/FI2021/050137, filed Feb. 25, 2021, which international application was published on Sep. 10, 2021, as International Publication WO 2021/176136 A1 in the English language. The International Application claims priority of Finnish Patent Application No. 20205243 filed Mar. 6, 2020.

TECHNICAL FIELD

The present invention generally relates to restraining of service access to a horizontal shaft impactor, HSI, crusher chamber. The invention relates particularly, though not exclusively, to security restraint of at least one of an access opening and the HSI rotator.

BACKGROUND ART

This section illustrates useful background information without admission of any technique described herein representative of the state of the art.

HSI crushers operate using a horizontal shaft that is equipped with radially extending beater elements. The beater elements break stones by hitting them with a significant non-yielding mass and by throwing stones against sturdy counter-surfaces. The HSI crusher has a housing within which the crushing takes place.

For service access, some HSI crushers have a service opening closed by a door, lid or hatch, herein generally termed as a hatch. The hatch is hinged to the housing. The hatch enables checking of the condition of the beater elements when the crusher is stopped. Some HSI beater elements are also configured to be vertically opened by lifting a top part of the housing. Opening of the entire top part enables replacing the entire horizontal shaft with its beater elements and/or wear parts providing the opposite surfaces.

As a safety feature, the horizontal shaft is locked by a pin to one of four different positions in order to prevent the axle rotating on service. For example, the horizontal shaft could suddenly start rotating during removal of some of the beater elements and residual mineral material that has been on top of one side of the horizontal shaft. Such a sudden rotation of the horizontal shaft may be dangerous. It is desirable to further improve safety of HSI crusher maintenance and/or to facilitate gaining service access to the HSI crusher and to provide a compact arrangement especially for mobile crushing plants, wherein space for maintenance operations is limited.

SUMMARY

The appended claims define the scope of protection. Any examples and technical descriptions of apparatuses, products and/or methods in the description and/or drawings not covered by the claims are presented not as embodiments of the invention but as background art or examples useful for understanding the invention.

According to a first example aspect of the invention there is provided a restraining apparatus for a horizontal shaft crusher that comprises a crushing chamber and a service hatch for opening and closing a service entry to the crushing chamber, the restraining apparatus comprising:

- a first restraint movable between a blocking state and an access state in which the first restraint respectively restrains and allows opening of the service hatch for service access; and
- a second restraint movable between a running state and a control state, the second restraint comprising an engagement member;
- wherein when the second restraint is in the control state, the engagement member is in a use position for restraining rotation of the horizontal shaft;
- wherein when the second restraint is in the running state, the engagement member is in an idle position for not restraining the rotation of the horizontal shaft;
- wherein the first and second restraints are collectively configured to:
- prevent moving the first restraint from the blocking state to the access state if the second restraint is in the running state;
- prevent moving the second restraint from the control state to the running state if the first restraint is in the access state;
- allow moving the first restraint from the access state to the blocking state; and
- allow moving the second restraint from the running state to the control state.

In the blocking state, the first restraint may keep the hatch closed so as to block accessing the crushing chamber through via a hatch opening covered by the service hatch. In the access state, the first restraint may allow opening the hatch so as to enable accessing the crushing chamber through via the hatch opening.

In the running state, the second restraint may allow running the horizontal shaft although the horizontal shaft need not be always running when the second restraint is in the running state. In the control state, the second restraint may control motion of the horizontal shaft by braking the shaft, being ready to brake the shaft or having a service drive coupled with the shaft. The service drive may employ a drive motor used for running the horizontal shaft, but powered with a service powering. The service powering may use a different hydraulic pump or the same hydraulic pump than the pump used for running the horizontal shaft in operation to crush mineral material, but with a lower power drive, such as a battery operated motor.

The first restraint may be movable along a first free trajectory. The first free trajectory may refer to a path along which the first restraint moves on changing between the access state and the blocking state.

The second restraint may be movable along a second free trajectory. The second free trajectory may refer to a path along which the second restraint moves on changing between the control state and the running state.

The first restraint may be configured to block the second free trajectory unless the first restraint is in the blocking state. The first restraint may comprise a first blocking member configured to block the second free trajectory unless the first restraint is in the blocking state. The first blocking member may comprise a first body. The first body may be shaped to comprise an abutting edge configured to abut with a second body of the second restraint. The first body may be formed of a plate, optionally steel plate. The steel plate may have a thickness of 16 mm±10 mm.

The second restraint may be configured to block the first free trajectory unless the second restraint is in the control state. The second restraint may comprise a second blocking member configured to block the first free trajectory unless the second restraint is in the control state. The second blocking member may comprise the second body. The second body may be shaped to comprise an abutting edge configured to abut with the first body of the first restraint. The second body may be formed of a plate, optionally steel plate. The second body may be a profile. The steel plate may have a thickness of 16 mm±10 mm.

The first restraint may be configured to form a stepping surface on which an operator may step for using the service hatch when the first restraint is in the access state.

The first restraint may be hinged to move along the first free trajectory. The first restraint may have a sliding attachment allowing sliding the first restraint along the first free trajectory.

The second restraint may be hinged to move along the second free trajectory. The second restraint may have a sliding attachment allowing sliding the second restraint along the second free trajectory.

The first restraint may be integrated to the service hatch. The service hatch may be horizontally hinged. The service hatch may be hinged so that when opened, an edge of the service hatch prevents moving the second restraint to the operation state. The second restraint may be hinged perpendicularly to the hinging axis of the first restraint, or at an angle between 80 and 100 degrees. The second restraint may have a hinge axis that is sufficiently close to the service hatch such that the service hatch cannot be turned towards an opened configuration by more than 1 mm; 5 mm; 1 cm; 2 cm; or 5 cm unless the second restraint is in the control state.

The engagement member may comprise a brake configured to inhibit the horizontal shaft starting to rotate by an imbalanced load. The brake may be a disc brake. The brake may be configured to either brake or not brake the horizontal shaft while the second restraint is in the control state.

The crushing chamber may comprise a plurality of crushing elements configured to cause crushing forces to mineral material objects being crushed. The crushing elements may be carried by a horizontal shaft.

The engagement member may comprise a service drive coupling configured to allow controlled service rotation of the horizontal shaft at a service speed. The service drive coupling may comprise a gear. The service drive coupling may comprise a belt. The service drive coupling may comprise a clutch part. The service speed may be such that crushing elements carried by the horizontal shaft move at most 1 cm/s; 2 cm/s; 5 cm/s; or 10 cm/s.

The service drive may comprise a motor. The motor may be a hydraulic motor. The motor may be an electric motor. The service drive may comprise a gear assembly configured to engage with the horizontal shaft.

The horizontal shaft may be configured to endure imbalanced loading momentum on one radial side greater than the opposite side of at least: 1000 Nm; 1500 Nm; 3000 Nm; 5000 Nm; or 10000 Nm.

The restraining apparatus may be particularly useful with a crusher having horizontal axle driven crushing of mineral material, and having a service access equipped enclosure protector of the horizontal shaft.

According to a second example aspect of the invention there is provided a service access restraining method for a horizontal shaft crusher that comprises a crushing chamber and a service hatch for opening and closing a service entry to the crushing chamber, the method comprising:

supporting a first restraint movably between a blocking state and an access state in which in the first restraint respectively restrains and allows opening of the service hatch for service access; and supporting a second restraint movably between a control state and a running state;

supporting movably by the second restraint an engagement member so that:

when the second restraint is in the control state, the engagement member is in a use position for restraining rotation of the horizontal shaft; and when the second restraint is in the running state, the engagement member is in an idle position for not restraining the rotation of the horizontal shaft;

the method further comprising using the first and second restraints collectively to:

prevent moving the first restraint from the blocking state to the access state if the second restraint is in the running state;

prevent moving the second restraint from the control state to the running state if the first restraint is in the access state;

allow moving the first restraint from the access state to the blocking state; and allow moving the second restraint from the running state to the control state.

According to a third example aspect of the invention there is provided a horizontal shaft crusher comprising the restraining apparatus of the first example aspect.

The horizontal shaft crusher may be a horizontal shaft impactor.

According to a fourth example aspect of the invention there is provided a mineral material crushing apparatus comprising the horizontal shaft crusher of the third example aspect.

According to a fifth example aspect of the invention there is provided a mineral material crushing plant comprising the mineral material crushing apparatus. The mineral material crushing plant may comprise a chassis. The chassis may comprise crawler tracks. The chassis may comprise wheels.

According to a sixth example aspect of the invention there is provided a restraint apparatus for controlling access to a crushing chamber of a horizontal shaft crusher, comprising:

a first restraint having an operation mode and a service mode for respectively blocking and allows opening a service hatch for accessing the crushing chamber; and a second restraint having an operation mode and a service mode for respectively not controlling the horizontal shaft and controlling the horizontal shaft;

wherein the first and second restraints are configured to be mutually exclusively usable in the operation mode so that the crushing chamber is not accessible through the service hatch unless the second restraint is controlling the horizontal shaft.

The mineral material crushing plant may be a mobile mineral material crushing plant.

Different non-binding example aspects and embodiments of the present invention have been described in the foregoing disclosed aspects. The embodiments in the foregoing disclosed aspects are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which:

FIG. 5 shows a front view of an alternative restraining apparatus; and

FIG. 6 shows a flow diagram of a method of an embodiment.

DETAILED DESCRIPTION

In the following description, like reference signs denote like elements or steps.

Figure 1:
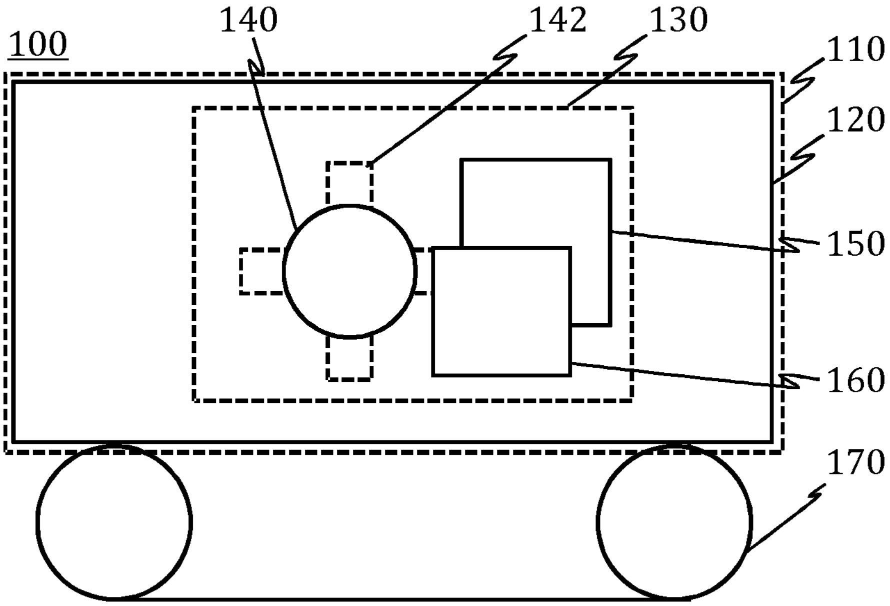
FIG. 1 shows a schematic drawing of a crushing plant of an embodiment.

FIG. 1 shows a schematic drawing of a crushing plant 100 of an embodiment. The crushing plant comprises a horizontal shaft crusher 110 that has a housing 120 surrounding a crushing chamber 130, a horizontal shaft 140 and beater elements 142 carried by the horizontal shaft 140. The horizontal shaft crusher 110 further comprises a service hatch 150 the service hatch 150 for opening and closing a service entry to the crushing chamber 130. The horizontal shaft crusher 110 further comprises a restraining apparatus 160. The restraining apparatus 160 is configured to control that the service hatch 150 would not be opened while the horizontal shaft 140 could be operated for crushing or turn by itself when imbalanced. The crushing plant further comprises crawler tracks 170 or wheels to provide maneuverability in quarries, sites or on the road.

In an embodiment, the restraining apparatus 160 is attached to the crushing plant via a body of the crushing plant. One or more parts of the restraining apparatus may be attached to the housing 120.

Figure 2:
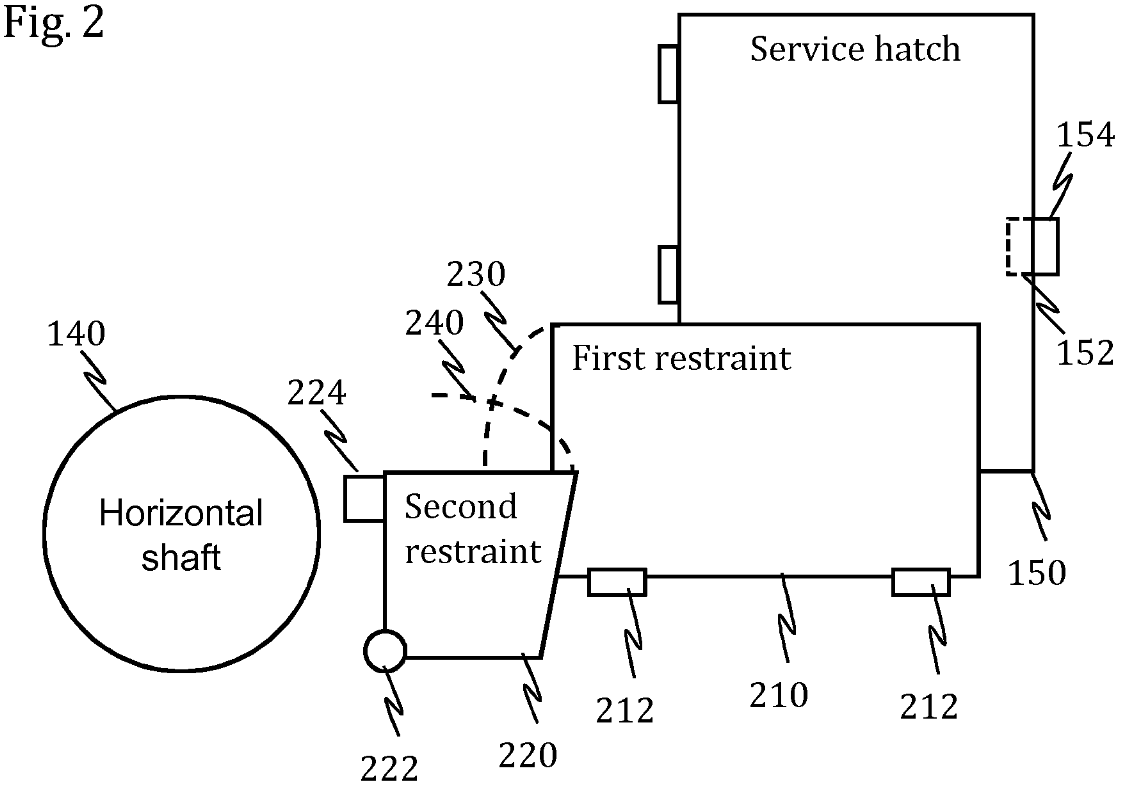
FIG. 2 shows a schematic drawing of a restraining apparatus of an embodiment.

FIG. 2 shows a schematic drawing of a restraining apparatus of an embodiment, the horizontal shaft 140 and the service hatch 150. The a restraining apparatus 160, comprises a first restraint 210 movable (e.g., using first hinges 212) between a blocking state and an access state in which in the first restraint 210 respectively restrains and allows opening of the service hatch 150; and a second restraint 220 movable (e.g., using second hinges 222) between a running state and a control state. The second restraint comprises an engagement member 224, 530.

In the control state, the engagement member 224, 530 is in a use position for restraining rotation of the horizontal shaft 140. In the running state, the engagement member 224, 530 is in an idle position for not restraining the rotation of the horizontal shaft 140.

The first and second restraints 210, 220 are collectively configured to:

- prevent moving the first restraint 210 from the blocking state to the access state if the second restraint 220 is in the running state;
- prevent moving the second restraint 220 from the control state to the running state if the first restraint 210 is in the access state;
- allow moving the first restraint 210 from the access state to the blocking state; and
- allow moving the second restraint 220 from the running state to the control state.

In FIG. 2, the engagement member 224 comprises a brake 224 configured to inhibit the horizontal shaft 140 starting to rotate by an imbalanced load. The brake 224 is, for example, a disc brake.

FIG. 1 also shows a plurality of crushing elements 142 such as beater elements in the crushing chamber for causing crushing forces to mineral material objects being crushed. The crushing elements 142 of FIG. 1 are carried by the horizontal shaft 140.

The first restraint 210 is movable along a first free trajectory 230. The first free trajectory 230 refers to a path along which the first restraint 210 moves on changing between the access state and blocking state.

The second restraint 220 is movable along a second free trajectory 240. The second free trajectory 240 refers to a path along which the second restraint 220 moves on changing between the running state and the control state.

The first restraint 210 of FIG. 2 is hinged to move along the first free trajectory 230. In an alternative embodiment, the first restraint 210 has a sliding attachment allowing sliding the first restraint 210 along a first free trajectory.

The second restraint 220 of FIG. 2 is hinged to move along a second free trajectory 240. In an alternative embodiment, the second restraint 220 has a sliding attachment allowing sliding the second restraint 220 along the second free trajectory.

In an embodiment, the first restraint 210 is integrated to the service hatch 150. The service hatch 150 may be horizontally hinged. For example, the service hatch 150 can be hinged so that when opened, an edge of the service hatch 150 prevents moving the second restraint 220 to the running state. The second restraint 220 may be hinged perpendicularly to the hinging axis of the first restraint 210. The second restraint 220 may have a hinge axis that is sufficiently close to the service hatch 150 such that the service hatch 150 cannot be turned towards an opened configuration by more than 1 mm; 5 mm; 1 cm; 2 cm; or 5 cm unless the second restraint 220 is in the control state.

In an embodiment, the first restraint 210 comprises one of more further parts. In an embodiment, the first restraint 210 comprises a hydraulic or electric circuitry. The circuitry may comprise a hatch latch actuator 154 for operating a latch 152.

In an embodiment, the second restraint 220 comprises one of more further parts. In an embodiment, the second restraint 220 comprises a hydraulic or electric circuitry. The circuitry may comprise a brake actuator.

In an embodiment, the second restraint is configured to release the hatch latch 152 only when the brake 224 has restrained the shaft 140. The hatch latch 152 may be configured to enforce stabilizing the shaft 140 before the hatch 150 is opened. The brake 224 may be controllably relieved or disabled while the hatch is open so that the brake 224 is at readiness for being used again to restrain the shaft 140.

Figure 3:
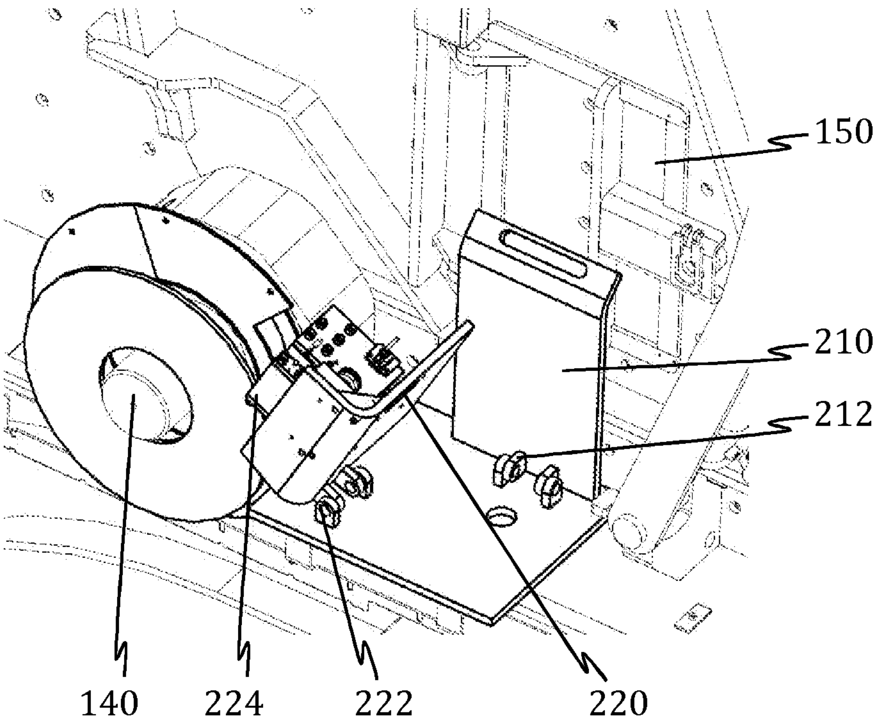
FIG. 3 shows a three-dimensional drawing of a restraining apparatus of an embodiment when a first restraint is in a blocking state and a second restraint is in a running state.
Figure 4:
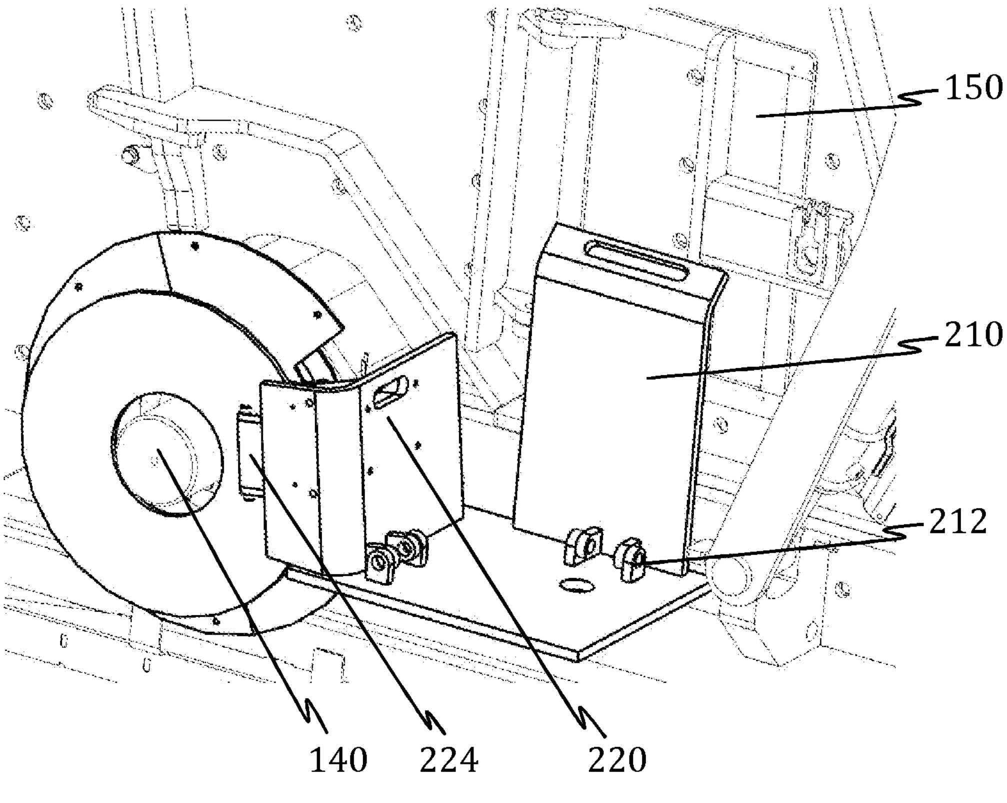
FIG. 4 shows a three-dimensional drawing of a restraining apparatus of FIG. 3 when the second restraint is in a control state.

FIG. 3 shows a three-dimensional drawing of a restraining apparatus of an embodiment when the first restraint 210 is in the blocking state and the second restraint 220 is in the running state and FIG. 4 shows a three-dimensional drawing of the restraining apparatus of FIG. 3 when the second restraint 220 is in the control state.

In FIG. 3, the first restraint 210 comprises a first blocking member configured to block the second free trajectory unless the first restraint 210 is in the access state. Here, the first blocking member has a first body that is shaped to comprise an abutting edge configured to abut with a second body of the second restraint 220. The first body is formed of a plate, optionally of a steel plate. The plate has a thickness, e.g., of at least 16 mm±10 mm.

The second restraint 220 of FIG. 3 comprises a second blocking member configured to block the first free trajectory unless the second restraint 220 is in the control state. The second blocking member may comprise the second body. The second body may be shaped to comprise an abutting edge configured to abut with the first body of the first restraint 210. The second body may be formed of a plate, optionally steel plate. The second body may be a profile. The steel plate may have a thickness of at least 16 mm±10 mm.

The first restraint 210 of FIG. 3 is configured to form a stepping surface on which an operator may step for using the service hatch 150 when the first restraint 210 is in the access state (when the first restraint 210 shown in FIG. 4 is rotated down) out of the way of the service hatch 150.

FIG. 5 shows a front view of an alternative restraining apparatus 500 in which the second restraint 220 comprises a service drive instead or in addition to the brake for allowing controlled service rotation of the horizontal shaft 140 at a service speed. The service speed may be such that crushing elements carried by the horizontal shaft move at most 1 cm/s; 2 cm/s; 5 cm/s; or 10 cm/s.

As shown in FIG. 5, an actuator 510 may be provided to move the second restraint. The actuator of FIG. 5 is a hydraulic cylinder. In other embodiments, the actuator is or comprises a solenoid, linear motor, pneumatic cylinder, or a rotational actuator. In an embodiment also or only the first restraint 210 is moved by a second actuator (not shown). The second actuator can be similar to or different than the actuator of the second restraint 220.

In FIG. 5, the service drive comprises a motor 520, such as a hydraulic motor or an electric motor. In FIG. 5, the service drive has a gear assembly configured to engage with the horizontal shaft. FIG. 5 shows a first cogwheel 530 driven by the motor 520 (e.g., via a gearing) and a second cogwheel 540 attached to the horizontal shaft 140.

The service drive may comprise a braking mechanism. The braking mechanism may comprise one or more check valves, if the motor 520 is a hydraulic motor. The braking mechanism may comprise a gearing with a transmission ratio greater than 7:1, 10:0 or 50:1 in rounds of a rotor of the motor in relation to the rounds of a coupling element configured to operate as or drive the coupling member.

FIG. 6 shows a flow diagram of a service access restraining method 600 for the horizontal shaft crusher 110 that comprises the crushing chamber 130 and the service hatch 150 for opening and closing a service entry 150 to the crushing chamber 130; the method comprising:

- 610. supporting the first restraint 210 movably between the blocking state and the access state in which in the first restraint 210 respectively restrains and allows opening of the service hatch 150 for service access;
- 620. supporting the second restraint 220 movably between the control state and the running state;
- 630. supporting movably by the second restraint 220 the engagement member 224, 530 so that when the second restraint 220 is in the control state, the engagement member 224, 530 is in a use position for restraining rotation of the horizontal shaft 140; and when the second restraint 220 is in the running state, the engagement member 224, 530 is in an idle position for not restraining the rotation of the horizontal shaft 140;
- 640. using the first and second restraints 210, 220 collectively to prevent moving the first restraint 210 from the blocking state to the access state if the second restraint 220 is in the running state;
- 650. using the first and second restraints 210, 220 collectively to prevent moving the second restraint 220 from the control state to the running state if the first restraint 210 is in the access state;
- 660. using the first and second restraints 210, 220 collectively to allow moving the first restraint 210 from the access state to the blocking state; and
- 670. using the first and second restraints 210, 220 collectively to allow moving the second restraint 220 from the running state to the control state.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A restraining apparatus for a horizontal shaft crusher that comprises a crushing chamber and a service hatch for opening and closing a service entry to the crushing chamber, the restraining apparatus comprising:

a first restraint movable along a first free trajectory between a blocking state and an access state in which the first restraint respectively restrains and allows opening of the service hatch; and a second restraint movable along a second free trajectory between a running state and a control state, the second restraint comprising an engagement member;

wherein when the second restraint is in the control state, the engagement member is in a use position for restraining rotation of the horizontal shaft;

wherein when the second restraint is in the running state, the engagement member is in an idle position for not restraining the rotation of the horizontal shaft;

wherein the first and second restraints are collectively configured to:

prevent moving the first restraint from the blocking state to the access state if the second restraint is in the running state;

prevent moving the second restraint from the control state to the running state if the first restraint is in the access state;

allow moving the first restraint from the access state to the blocking state; and allow moving the second restraint from the running state to the control state, wherein the first restraint is configured to block the second free trajectory unless the first restraint is in the blocking state.

2. The restraining apparatus of claim 1, wherein the second restraint is configured to block the first free trajectory unless the second restraint is in the control state.

3. The restraining apparatus of claim 1, wherein the first restraint is configured to form a stepping surface for an operator when the first restraint is in the access state.

4. The restraining apparatus of claim 1, wherein the first restraint is hinged to move along the first free trajectory.

5. The restraining apparatus of claim 1, wherein the second restraint is hinged to move along the second free trajectory.

6. The restraining apparatus of claim 1, wherein at least one of the first restraint and the second restraint has a sliding attachment.

7. The restraining apparatus of claim 1, wherein the first restraint is configured to be mounted to the service hatch.

8. The restraining apparatus of claim 1, wherein the engagement member comprises a brake configured to inhibit the horizontal shaft starting to rotate by an imbalanced load.

9. The restraining apparatus of claim 1, wherein the engagement member comprises a service drive coupling configured to allow controlled service rotation of the horizontal shaft at a service speed.

10. A mineral material crushing apparatus, comprising:
a horizontal shaft crusher; and
the restraining apparatus of claim 1.

11. A restraining apparatus for a horizontal shaft crusher that comprises a crushing chamber and a service hatch for opening and closing a service entry to the crushing chamber, the restraining apparatus comprising:
a first restraint hinged to move along a first free trajectory between a blocking state and an access state in which the first restraint respectively restrains and allows opening of the service hatch; and
a second restraint hinged to move along a second free trajectory between a running state and a control state, the second restraint comprising an engagement member;
wherein when the second restraint is in the control state, the engagement member is in a use position for restraining rotation of the horizontal shaft;
wherein when the second restraint is in the running state, the engagement member is in an idle position for not restraining the rotation of the horizontal shaft;
wherein the first and second restraints are collectively configured to:
prevent moving the first restraint from the blocking state to the access state if the second restraint is in the running state;
prevent moving the second restraint from the control state to the running state if the first restraint is in the access state;
allow moving the first restraint from the access state to the blocking state; and
allow moving the second restraint from the running state to the control state,
wherein the second restraint has a hinge axis that is perpendicular to a hinge axis of the first restraint.

12. A service access restraining method for a horizontal shaft crusher that comprises a crushing chamber and a service hatch for opening and closing a service entry to the crushing chamber, the method comprising:
supporting a first restraint for movement along a first free trajectory between a blocking state and an access state in which the first restraint respectively restrains and allows opening of the service hatch; and
supporting a second restraint for movement along a second free trajectory between a running state and a control state;
supporting movably by the second restraint an engagement member so that:
when the second restraint is in the control state, the engagement member is in a use position for restraining rotation of the horizontal shaft; and
when the second restraint is in the running state, the engagement member is in an idle position for not restraining rotation of the horizontal shaft;
wherein the first and second restraints collectively:
prevent moving of the first restraint along the first free trajectory from the blocking state to the access state if the second restraint is in the running state;
prevent moving of the second restraint along the second free trajectory from the control state to the running state if the first restraint is in the access state;
allow moving the first restraint from the access state to the blocking state; and
allow moving the second restraint from the running state to the control using the first restraint to block the second free trajectory unless the first restraint is in the blocking state.

* * * * *